United States Patent
Breh et al.

(10) Patent No.: US 9,569,203 B2
(45) Date of Patent: Feb. 14, 2017

(54) SERVICE-BASED INTEGRATION OF APPLICATION PATTERNS

(71) Applicant: International Business Machines Corporation, Armonk, NY (US)

(72) Inventors: Jochen E. Breh, Stuttgart (DE); Monika Illgner-Kurz, Herrenberg (DE); Ruediger Schulze, Boeblingen (DE); Thomas Spatzier, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 14/670,571

(22) Filed: Mar. 27, 2015

(65) Prior Publication Data

US 2016/0283223 A1 Sep. 29, 2016

(51) Int. Cl.
*G06F 9/44* (2006.01)
*H04L 29/08* (2006.01)

(52) U.S. Cl.
CPC ............... *G06F 8/70* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 6,637,020 B1 * | 10/2003 | Hammond | G06F 8/34 717/107 |
| 6,738,975 B1 | 5/2004 | Yee et al. | |
| 7,237,225 B2 | 6/2007 | Kompalli et al. | |
| 7,912,902 B2 | 3/2011 | Cheng et al. | |
| 8,316,386 B2 | 11/2012 | Kumar et al. | |
| 8,473,970 B2 | 6/2013 | Machiraju et al. | |
| 9,189,757 B2 * | 11/2015 | Finlayson | G06Q 10/06 |
| 2011/0208788 A1 | 8/2011 | Heller et al. | |
| 2012/0185821 A1 | 7/2012 | Yaseen et al. | |

OTHER PUBLICATIONS

Thullner et al., "Implementing Enterprise Integration Patterns Using Open Source Frameworks", provided in the search report dated Nov. 22, 2013.

* cited by examiner

*Primary Examiner* — Chuck Kendall

(74) *Attorney, Agent, or Firm* — Adolph Bohnstedt

(57) ABSTRACT

One or more processors generate a plurality of artifacts from a first application pattern description. The first application pattern description describes at least one instance of a first application pattern. One or more processors receive a request for a capability of an instance of the first application pattern. The capability is requested to augment a second application pattern instance. One or more processors analyze a second application pattern description. The second application pattern description describes the second application pattern instance. Based on an analysis of the second application pattern description, one or more processors install one or more of the plurality of artifacts against at least one server of the second application pattern instance. One or more processors execute one or more automated operations in order to enable the second application pattern instance with the capability.

20 Claims, 6 Drawing Sheets

SERVICE-BASED INTEGRATION OF
APPLICATION PATTERNS

BACKGROUND OF THE INVENTION

The present invention relates generally to the field of application pattern deployment for information technology (IT) landscapes, and more particularly to application patterns for IT landscapes that include applications, databases, and servers.

An application pattern is a template or blueprint of a complex setup of IT resources. Application patterns focus on the provisioning of servers, operating systems, etc. in order to create the application landscape itself. For example, some application patterns describe web portal environments. There are systems available that are able to instantiate running environments based on application patterns. Instantiation in this context refers to the provisioning and configuration of an application pattern. A single application pattern can be instantiated multiple times. The result of each instantiation process is a pattern instance, which includes a pattern description.

Application patterns often require integration with other application patterns. An example is hosting or production environments in which application landscapes (i.e. patterns) frequently require integration into system management infrastructures, which can also be thought of as application patterns. To complicate matters, system management infrastructures vary considerably depending on the provider and their details are typically unknown to the authors of application patterns requiring integration. In addition, multiple diverse application patterns will often share the same systems management infrastructure. It is an ongoing challenge to integrate system management topologies into various application patterns. Typically, such integrations would require modification of the application pattern, the system management infrastructure, or both. If one considers just the common cases where multiple application patterns require integration with a given system management infrastructure, incorporation of the same system management topology into multiple application patterns would be required. In other words, multiple instantiations of the same system management topology into the application patterns would be necessary.

SUMMARY

Embodiments of the present invention provide a method, system, and program product for integrating application pattern instances. One or more processors generate a plurality of artifacts from a first application pattern description, wherein the first application pattern description describes at least one instance of a first application pattern. One or more processors receive a request for a capability of an instance of the first application pattern, wherein the capability is requested to augment a second application pattern instance. One or more processors analyze a second application pattern description, wherein the second application pattern description describes the second application pattern instance. Based on an analysis of the second application pattern description, one or more processors install one or more of the plurality of artifacts against at least one server of the second application pattern instance. One or more processors execute one or more automated operations in order to enable the second application pattern instance with the capability.

BRIEF DESCRIPTION OF THE SEVERAL
VIEWS OF THE DRAWINGS

FIG. 1 is a functional block diagram illustrating an application pattern integration environment, in accordance with an exemplary embodiment of the present invention.

FIG. 2 provides an overview of operational processes of an integration service program, on a computing device within the environment of FIG. 1, in accordance with an exemplary embodiment of the present invention.

DETAILED DESCRIPTION

Embodiments of the present invention recognize that changing pattern instances in order to extend their capabilities is wasteful. Embodiments of the present invention provide an ability to integrate pattern instances in order to extend capabilities without changing said pattern instances.

The present invention will now be described in detail with reference to the Figures.

Figure 1:
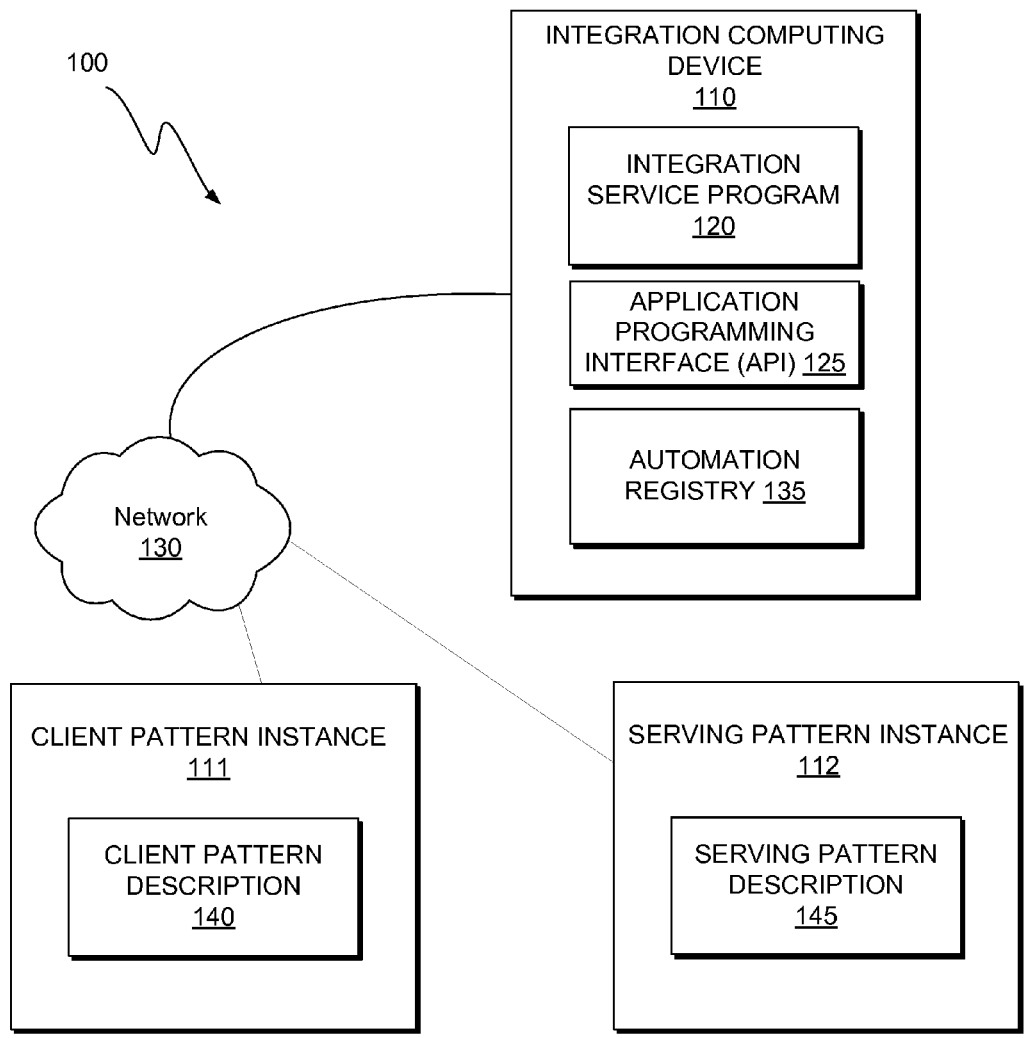

FIG. 1 is a functional block diagram illustrating an application pattern integration environment, generally designated 100, in accordance with one embodiment of the present invention. Application pattern integration environment 100 includes integration computing device 110, client pattern instance 111, and serving pattern instance 112 connected over network 130. Integration computing device 110 includes integration service program 120, application programming interface (API) 125, and automation registry 135. Client pattern instance 111 and serving pattern instance 112 include client pattern description 140 and serving pattern description 145, respectively.

In various embodiments of the present invention, integration computing device 110 is a computing device that can be a standalone device, a server, a laptop computer, a tablet computer, a netbook computer, a personal computer (PC), or a desktop computer. In another embodiment, integration computing device 110 represents a computing system utilizing clustered computers and components to act as a single pool of seamless resources. In general, integration computing device 110 can be any computing device or a combination of devices with access to API 125 and automation registry 135 and is capable of executing integration service program 120. Integration computing device 110 may include internal and external hardware components, as depicted and described in further detail with respect to FIG. 6.

In this exemplary embodiment, integration service program 120, API 125, and automation registry 135 are stored on integration computing device 110. However, in other embodiments, integration service program 120, API 125, and automation registry 135 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between integration service program 120, API 125, and automation registry 135, in accordance with a desired embodiment of the present invention.

In exemplary embodiments, integration computing device 110 has at least two states. The first state is a state wherein integration service program 120 modifies automation registry 135 by becoming instantiated with a pattern description such as serving pattern description 145. The second state is a state wherein integration service program 120 has not modified automation registry 135 by instantiation with a pattern description, or has cleared automation registry 135 of agents and tools incorporated during instantiation.

In exemplary embodiments, integration service program 120 receives a request through API 125 from a user seeking capabilities that are included in a pattern instance. For example, a user requests capabilities of serving pattern instance 112 to be used in the execution of jobs involving client pattern instance 111. The user obtains these capabilities for use with client pattern instance 111 from computing device 110 while computing device 110 is in its first state, i.e., integration service program 120 has previously modified automation registry 135 by instantiation with serving pattern description 145. In some embodiments, integration service program 120 modifies automation registry 135 by instantiation with a pattern description such as serving pattern description 145 prior to receiving a request through API 125 from the user. In other embodiments, integration service program 120 modifies automation registry 135 by instantiation with a pattern description such as serving pattern description 145 after receiving a request through API 125 from the user.

In exemplary embodiments, client pattern instance 111 and serving pattern instance 112 are pattern instances that have been instantiated from application patterns. In other words, client pattern instance 111 and serving pattern instance 112 are application landscapes including at least one software application executing on at least one operating system within at least one computing device, which includes at least one database in some embodiments. In various embodiments, client pattern instance 111 is integrated with serving pattern instance 112 by integration computing device 110 with capabilities present in serving pattern instance 112.

In exemplary embodiments, client pattern description 140 and serving pattern description 145 are descriptions of the environments included in client pattern instance 111 and serving pattern instance 112. Integration service program 120 uses the descriptions of these environments to facilitate integration of both instances. As used herein, integration of two or more instances means that one pattern instance gains capabilities of the other pattern instance via integration service program 120. For example, if a user wishes to integrate capabilities of serving pattern instance 112 into client pattern instance 111, integration service program 120 modifies automation registry 135 with agents and tools from serving pattern description 145. Integration service program 120 then introspects client pattern description 140 and installs the appropriate agents and tools against the client pattern instance 111 servers based on the topology and deployed applications of client pattern instance 111. When client pattern instance 111 no longer requires the capabilities of serving pattern instance 112, automation registry 135 is cleared by integration service program 120.

Figure 2:
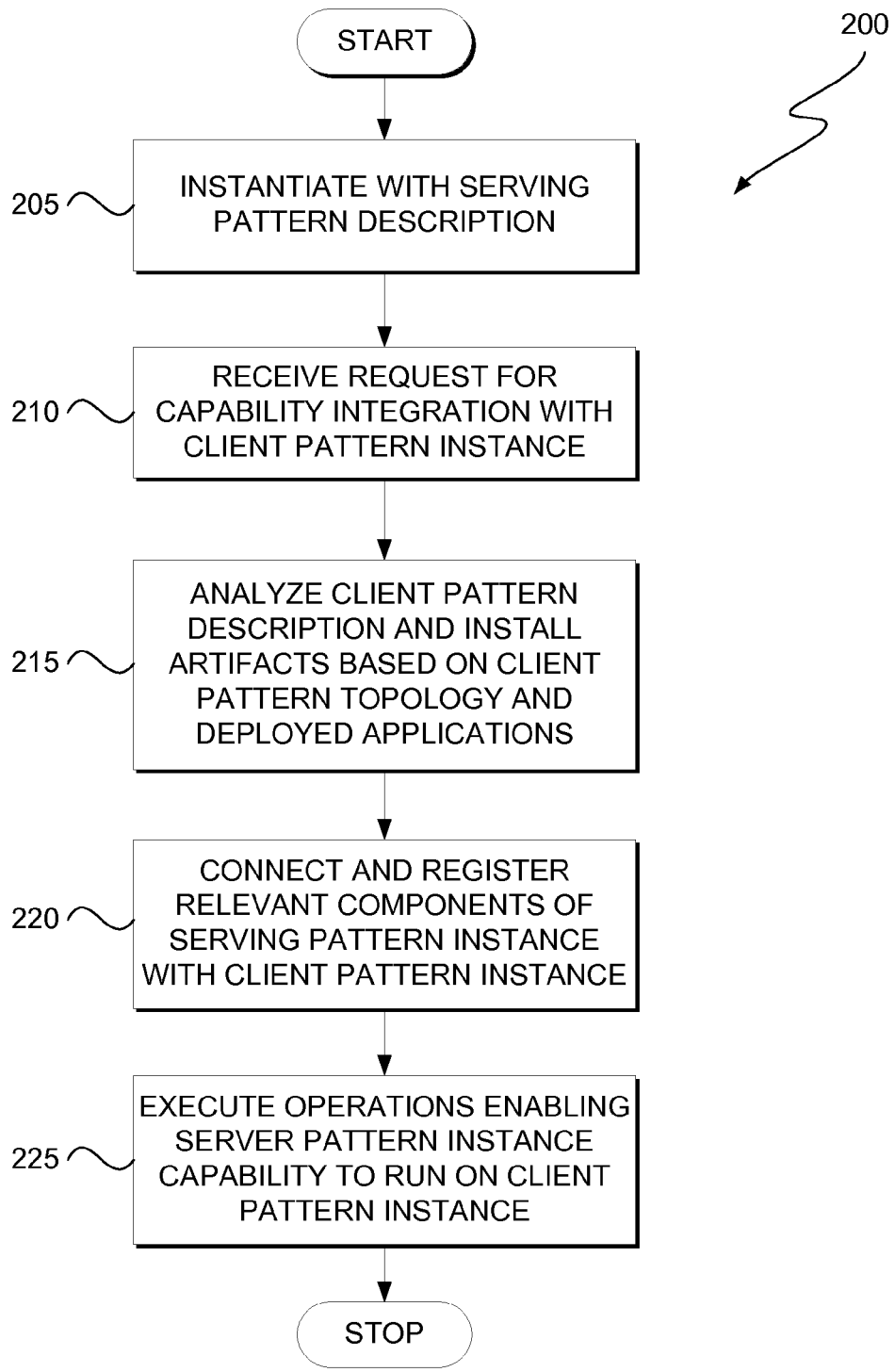

FIG. 2 provides an overview of operational processes, 200, of integration service program 120, on computing device 110 within the environment of FIG. 1, in accordance with an exemplary embodiment of the present invention. The operational processes overviewed in FIG. 2 are described in more detail in FIGS. 4 and 5.

In step 205, integration service program 120 instantiates integration computing device 110 with serving pattern description 145. The instantiation process modifies automation registry 135 with artifacts (e.g. agents, tools, etc.) necessary to allow integration computing device 110 the ability to integrate serving pattern instance 112 capabilities with other pattern instances such as client pattern instance 111. Once instantiation has occurred, integration computing device 110 gains the functionality to integrate one or more capabilities of serving pattern instance 112. In one embodiment, serving pattern instance 112 is a systems management infrastructure involved in a plurality of tasks such as one or more of: hardware inventories, server availability monitoring and metrics, software inventory and installation, anti-virus and anti-malware management, user activity monitoring, capacity monitoring, security management, storage management, network capacity and utilization monitoring, anti-manipulation management, and patch management.

Step 210 describes a user request for integration of client pattern instance 111 with the capabilities of instantiated integration computing device 110. For example, the user requests these capabilities through a call using API 125. Integration service program 120 then performs a knowledge-based translation of the specified capability into a series of internally defined automated operations for which automation artifacts are stored in automation registry 135. In this instance, automated operations are typical deployment tasks such as copy, install, configure, register, etc. and can vary depending on the usage scenario requested. In one embodiment, the request specifies the capability (including service type) and the pattern instance that requires that capability. For example, a user requests a systems management capability such as a patch management capability to fix, improve, or update software or data in a user-specified pattern instance such as client pattern instance 111.

In step 215, integration service program 120 analyzes client pattern description 140 contained within client pattern instance 111 and, based on the requested capability and the client pattern instance 111 topology, determines what automated operations are to be executed. Integration program 120 subsequently installs artifacts from automation registry 135 onto at least one server of client pattern instance 111 and determines which configurations are to be applied.

In step 220, integration server program 120 connects and registers all relevant components of serving pattern instance 112 and client pattern instance 111 based on an analysis of the client pattern instance 111 topology and the user request. In various embodiments, the components that are registered include adapter realizations, adapters, and links to the automation artifacts, which are stored in an adapter registry (vide infra). Components that are involved in the connection of serving pattern instance 112 with client pattern instance 111 include nodes of both pattern instances, which are connected via integration server program 120 adapters to adapter realizations, constraints, and automation artifacts in automation registry 135 (vide infra).

In step 225, integration server program 120 executes operations that enable client pattern instance 111 to have the user-requested capabilities.

Figure 3:
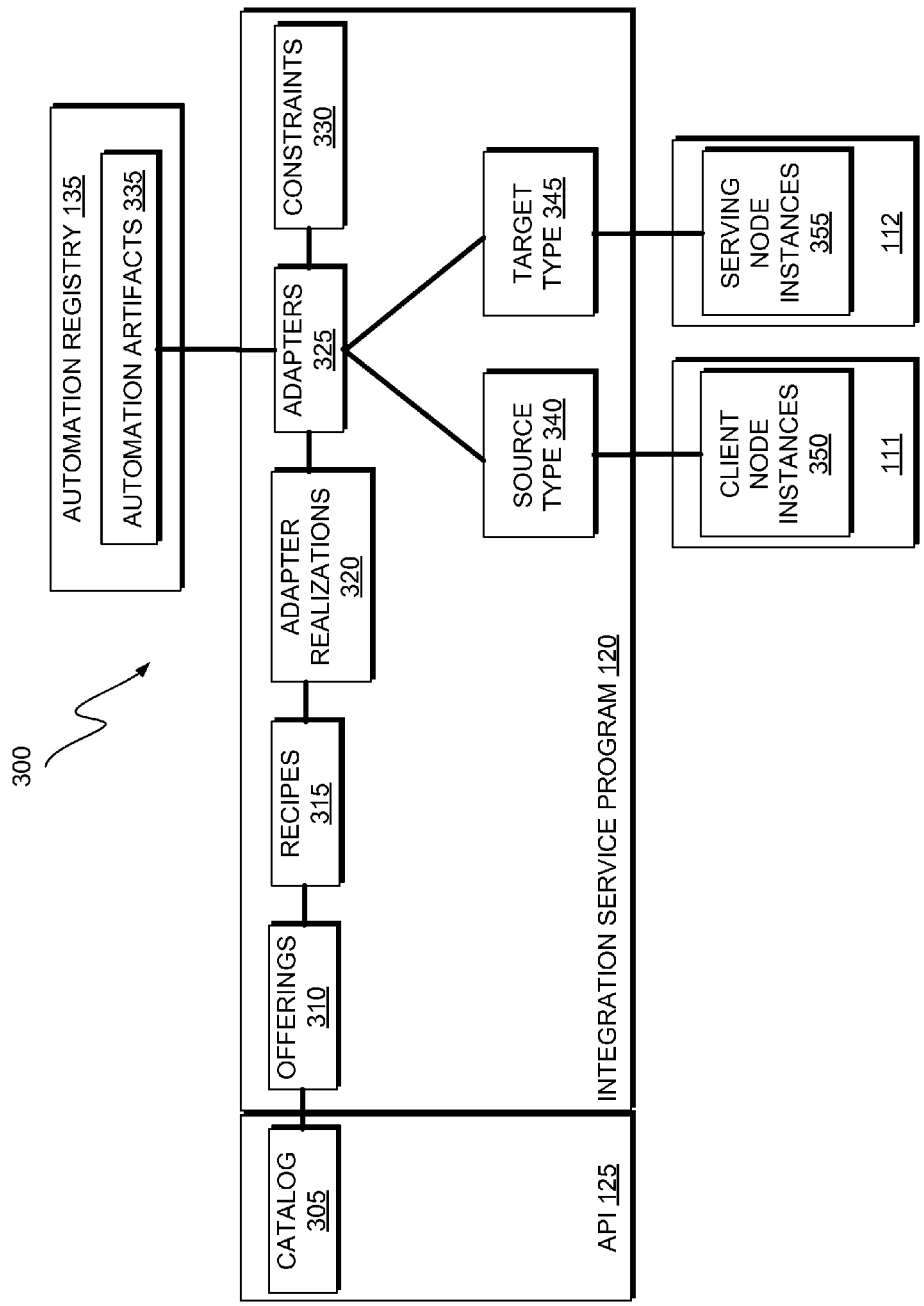
FIG. 3 is a block diagram showing component relationships within and between the integration service program, an application programming interface (API), an automation registry, and at least two pattern instances within the environment of FIG. 1, in accordance with an exemplary embodiment of the present invention.

FIG. 3 is a block diagram, 300, showing component relationships within and between integration service program 120, API 125, automation registry 135, client pattern instance 111, and serving pattern instance 112 within the environment of FIG. 1, in accordance with an exemplary embodiment of the present invention.

Catalog 305 contains a list of one or more offerings 310 through which a user selects a capability to be provided by integration service program 120. The user accesses catalog 305 through API 125. Offerings 310 describe service capabilities available to the user, the service capabilities originating from integration service program 120 to client pattern instance 111. For example, "Transaction Monitoring for Websphere" is a possible offering for a WEBSPHERE pattern instance. Offerings 310 include one or more recipes 315. Recipes 315 describe basic services that have to be applied to or removed from client pattern instance 111 in order to provide the user-requested offering from offerings 310. For example, the offering "Transaction Monitoring for Websphere" includes the recipes "OS Monitoring" and "Websphere monitoring." A recipe within recipes 315 can be realized using one or more adapter realizations 320. Recipes 315 are associated with operations, e.g. "Deploy" or "Undeploy."

Each recipe in recipes 315 are associated with one or more adapter realizations 320. Adapter realizations 320 describe the realizations of recipes 315 using specific products or implementations. For example, the recipe "OS Monitoring" is realized with adapter realization "ITM OS Monitoring" using IBM TIVOLI MONITORING. The recipe "Websphere Monitoring" is realized by the adapter realizations "ITCAM Websphere monitoring" and "ITM Websphere Monitoring." An adapter realization is mapped to one or more adapters 325 that are OS specific. Adapters 325 include a source type connection 340 and a target type connection 345, which must match the client node instances 350 and the serving node instances 355, respectively, in which they are connected. Adapters 325 link the following components together: i) a specific adapter realization; ii) a specific type of one or more client node instances 350; iii) a specific type of one or more serving node instances 355; iv) any needed automation artifacts 335 in automation registry 135; and v) one or more constraints 330. For example, an adapter realization "ITM Websphere Monitoring" is linked by adapter "ITM Websphere for Linux Monitoring" to client node instance "WAS 8.5 Application Server node" (Websphere Application Server), serving node instance "ITM 7.1 Monitoring Server," and automation artifacts for the operations "Install and Register" and "Unregister and uninstall" of the ITM 7.1 Websphere agent for Linux.

Constraints 330 describe conditions that apply to the current adapter in relation to other adapters. For example, the adapter "ITM Websphere for Linux Monitoring" has to connect to same serving node instances 355 as the adapter "ITM OS Monitoring" for Linux. Automation artifacts 335 are entries in automation registry 135. An automation artifact includes a plan fragment for each operation, which allows the incorporation of those operations into a plan. Automation artifacts 335 also include deployment scripts, configuration templates and a reference to the installables. For example, an automation artifact "Install and Register" for ITM 7.1 Websphere agent contains a configuration template to configure the deployment and registration of the agent along with the related deployment scripts needed to execute the installation, registration, and agent installables for different operating systems. Client node instance 350 and serving node instance 355, which are connected to adapters 325 through source type 340 and target type 345, respectively, are specific nodes of client pattern instance 111 and serving pattern instance 112, respectively. Client node instance 350 and serving node instance 355 each have a management IP address and can be accessed using credentials stored in, for example, a pattern instance registry.

Figure 4:
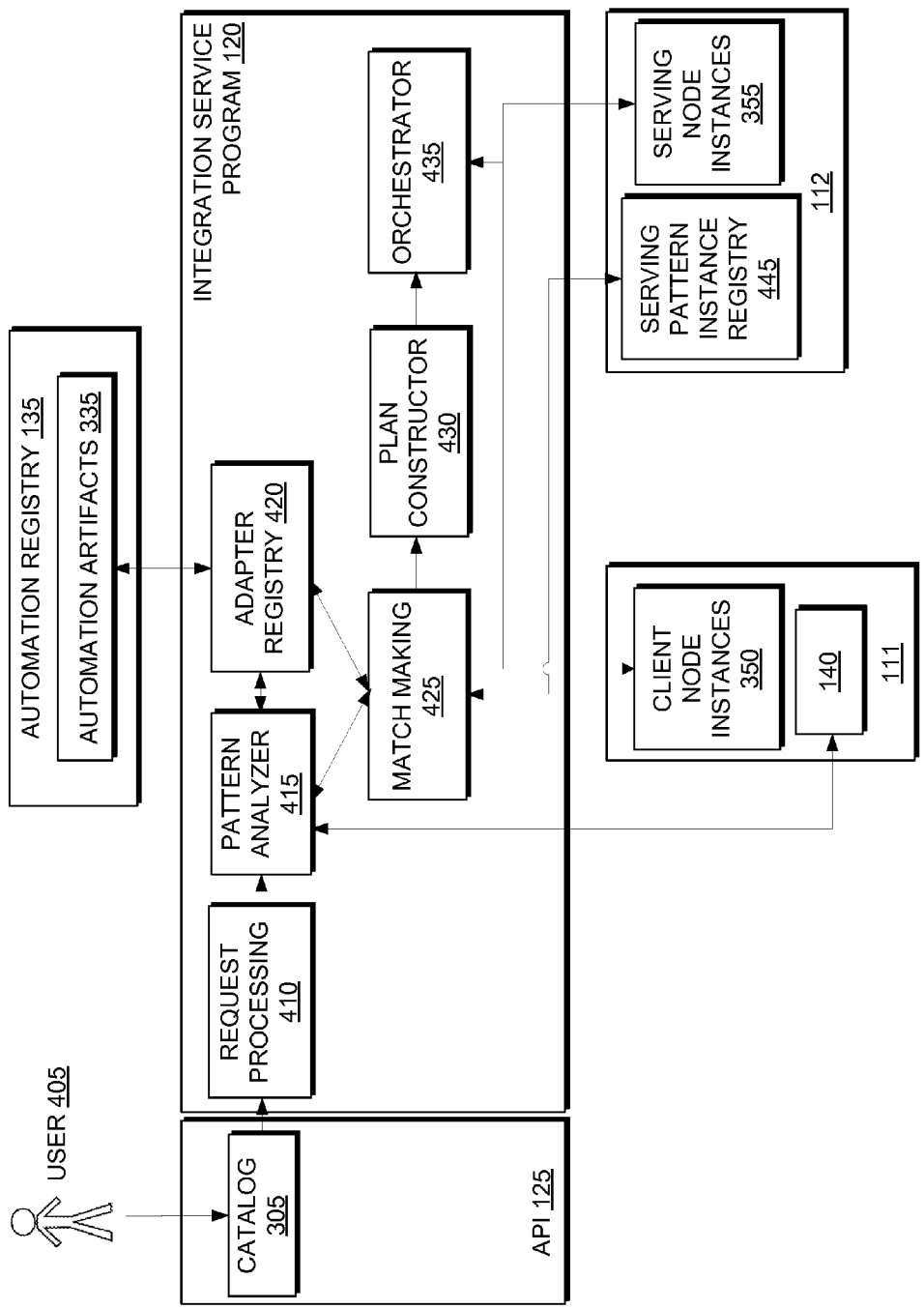
FIG. 4 depicts a block diagram showing sub-processes within and between the integration service program, the API, the automation registry, and the at least two pattern instances within the environment of FIG. 1, in accordance with an exemplary embodiment of the present invention.

FIG. 4 depicts a block diagram showing sub-processes within and between integration service program 120, API 125, automation registry 135, client pattern instance 111, and serving pattern instance 112 within the environment of FIG. 1, in accordance with an exemplary embodiment of the present invention.

API 125 provides catalog 305 to user 405 in order to allow user 405 to make a request for a capability of instantiated integration computing device 110. API 125 also monitors the status of this transaction. Request processing 410 processes the incoming request by parsing the selected service capabilities from offerings 310 and selecting basic services from recipes 315. Request processing 410 determines which adapter realizations 320 are required for the selected recipes and coordinates the interaction of integration service program 120 components to deploy or remove requested service capabilities from at least one of client pattern instance 111 and service pattern instance 112. Pattern analyzer 415 analyzes client pattern description 140 in order to determine the client pattern instance 111 topology. Pattern analyzer 415 filters for an optional user-specified node type and returns matching client node instances 350, which include the node name, type, and access information. Adapter registry 420 is a registry for storing information about adapter realizations 320, adapters 325, and links to the automation artifacts 335 in the automation registry 135.

Match making 425 uses pattern analyzer 415 to retrieve information about client node instances 350 from client pattern instance 111. Pattern analyzer 415 obtains information about client node instances 350 from client pattern description 140. For each client node instance and adapter realization, match making 425 searches adapter registry 420 for an adapter that has a source type that matches the client node instance and the adapter realization. The adapters 320 that match are grouped according to whether their constraints match. In other words, any group of adapters 325 that match making 425 has grouped will have the same constraints 330.

Next, match making 425 analyzes the target type of the grouped adapters and uses this information to search serving pattern instance registry 445 for one or more serving pattern instances with serving node instances 355 that match the target type of the grouped adapters. Match making 425 selects a serving pattern instance from the resulting set of service pattern instances and uses pattern analyzer 415 to filter serving node instances 355 of this particular serving pattern instance. In some embodiments, match making 425 uses annotations for load balancing in serving pattern description 145 to identify a single matching serving node instance of the target type from a list of serving node instances. Match making 425 gets automation artifacts about the adapter from automation registry 135 through adapter registry 420. Match making 425 uses target node information to populate the configuration template and requests plan constructor 430 to add plan fragments of agents to the plan using the populated configuration template. Plan constructor 430 builds a plan from the plan fragments received from match making 425 and orchestrator 435 executes the plan.

As used herein, a plan is a workflow description of operations to be performed on a managed environment. A plan can be executed by an orchestration engine in order to perform those operations in the right sequence and with the right input parameters on resources of the managed environment. For example, an operation could be to install some agent on a certain server or to register an agent endpoint with a component of the serving pattern instance. A plan fragment is a collection of only a few operations (for one integration to be performed by the integration service) that can be added to the overall plan. At the end, the overall plan is a combination of all the plan fragments added to it during the construction phase.

Figure 5:
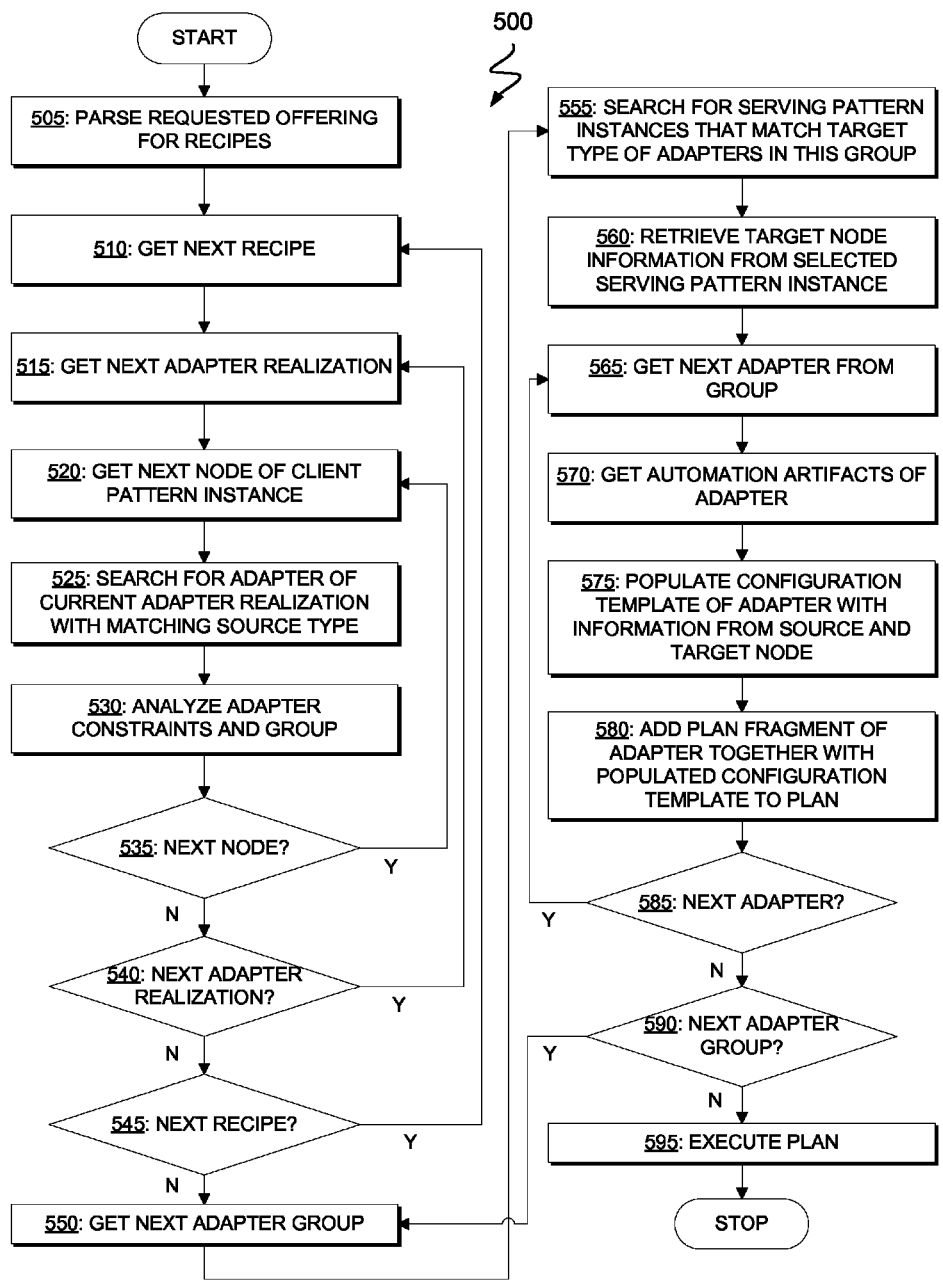
FIG. 5 illustrates a process flow within an integration service program, on a computing device within the environment of FIG. 1, in accordance with an exemplary embodiment of the present invention.

FIG. 5 illustrates a process flow, 500, within integration service program 120, on computing device 110 within the environment of FIG. 1, in accordance with an exemplary embodiment of the present invention.

In step 505, integration service program 120 searches recipes 315 for one or more recipes that match a user-requested offering from offerings 310. After matching recipes have been determined, a first recipe is selected (step 510) and adapter realizations 320 are searched for one or more adapter realizations that can implement the recipe selected in step 510. Once the one or more adapter realizations have been identified, a first adapter realization is selected (step 515) along with a first client node instance from client node instances 350 (step 520). In step 525, integration service program 120 searches through adapters 325 for one or more adapters that match the adapter realization selected in step 515 and have a source type connection that matches the client node instance selected in step 520. Constraints 330 of the selected adapters are analyzed by integration service program 120 and the adapter is then grouped with other adapters that have matching constraints (step 530).

In various embodiments, a recipe lists more than one adapter realization that is capable of the same purpose. In these embodiments, integration service program 120 decides which adapter realization will be employed on one or more criteria including cost differential, client pattern instance 111 installation size, and what type of environment is involved such as developmental, test, or production types.

In step 535, integration service program 120 determines whether there is another client node instance in client node instances 350 that has not been selected for connection through adapters 325 with the current adapter realization. If there is another unselected client node instance in client node instances 350 that has not been selected for connection through adapters 325 with the current adapter realization, steps 520-535 are repeated until there are no more unselected client node instances left in client node instances 350 that have not been selected for connection through adapters 325 with the current adapter realization. When the above process loop is finished, all adapters capable of connecting any client node instances 350 to the current selected adapter realization are determined and grouped according to whether the adapters have matching constraints 330.

In step 540, integration service program 120 determines whether there is another adapter realization in adapter realizations 320 that can implement the current selected recipe from step 510. If there is another adapter realization in adapter realizations 320 that can implement the current selected recipe from step 510, steps 515-540 are repeated until there are no more adapter realizations in adapter realizations 320 that can implement the current selected recipe from step 510. When the above process loop is finished, all adapters in adapters 325 capable of connecting any client node instances 350 to any adapter realizations in adapter realizations 320 that can implement the current selected recipe from step 510 are determined and grouped according to whether the adapters have matching constraints 330.

In step 545, integration service program 120 determines whether there is another recipe in recipes 315 that can provide part or all of the requested offering in step 505. If there is another recipe in recipes 315 that can provide part or all of the requested offering in step 505, steps 510-545 are repeated until there are no more recipes in recipes 315 that can provide part or all of the requested offering in step 505. When the above process loop is finished, all adapters in adapters 325 capable of connecting any client node instances 350 to any adapter realizations in adapter realizations 320, wherein all recipes in recipes 315 that can provide part or all of the requested offering in step 505 have been determined, are grouped according to whether the adapters have matching constraints 330.

In step 550, integration service program 120 begins to analyze each of the adapter groups created in steps 505-545 in order to connect the individual adapters within these groups through serving node instances to a serving pattern instance. In step 555, integration service program 120 searches service pattern instance registry 445 for service pattern instances having service node instances that match the target type of the adapters in a first selected group of adapters. In step 560, integration service program 120 retrieves target node information from serving node instances 355 within the selected serving pattern instance 112. In step 565, integration service program 120 selects a first adapter within the current adapter group. In step 570, integration service program 120 retrieves automation artifacts from automation registry 135. In step 575, integration service program populates a configuration template of the current adapter with information from the source node and target node. In step 580, integration service program 120 adds a plan fragment of the current adapter along with the populated configuration template from step 575 to an execution plan.

In step 585, integration service program 120 determines whether there is another adapter in the current adapter group. If there is another adapter in the current adapter group, then steps 565-585 are repeated until there are no more adapters in the current adapter group. When the above process loop is finished, all adapters in the current adapter group have a configuration template populated with information from a source node and a target node. A plan fragment of the adapters along with the populated configuration templates are added to the execution plan.

In step 590, integration service program 120 determines whether there is another adapter group having not gone through steps 550-590. If there is another adapter group having not gone through steps 550-590, then steps 550-590 are repeated until all adapter groups have gone through steps 550-590. When the above process loop is finished, all adapter groups have been matched by target type to serving node instances within serving pattern instances found in serving pattern instance registry 445. In addition, all adapters in the adapter groups have a configuration template populated with information from a source node and a target node. A plan fragment of the adapters along with the populated configuration templates are added to the execution plan. The completed plan is executed in step 595.

In the above exemplary embodiments, a matching serving pattern instance 112 is found in serving pattern instance registry 445 for all adapters 325. In alternative embodiments, there may not be a matching serving pattern instance 112 in serving pattern instance registry for a given adapter. In these cases, integration serving program 120 searches a pattern repository for a pattern that has nodes of the target type. The plan constructor 430 component creates a plan to provision a pattern instance using the pattern found in the pattern repository. This pattern instance subsequently undergoes further processing.

Figure 6:
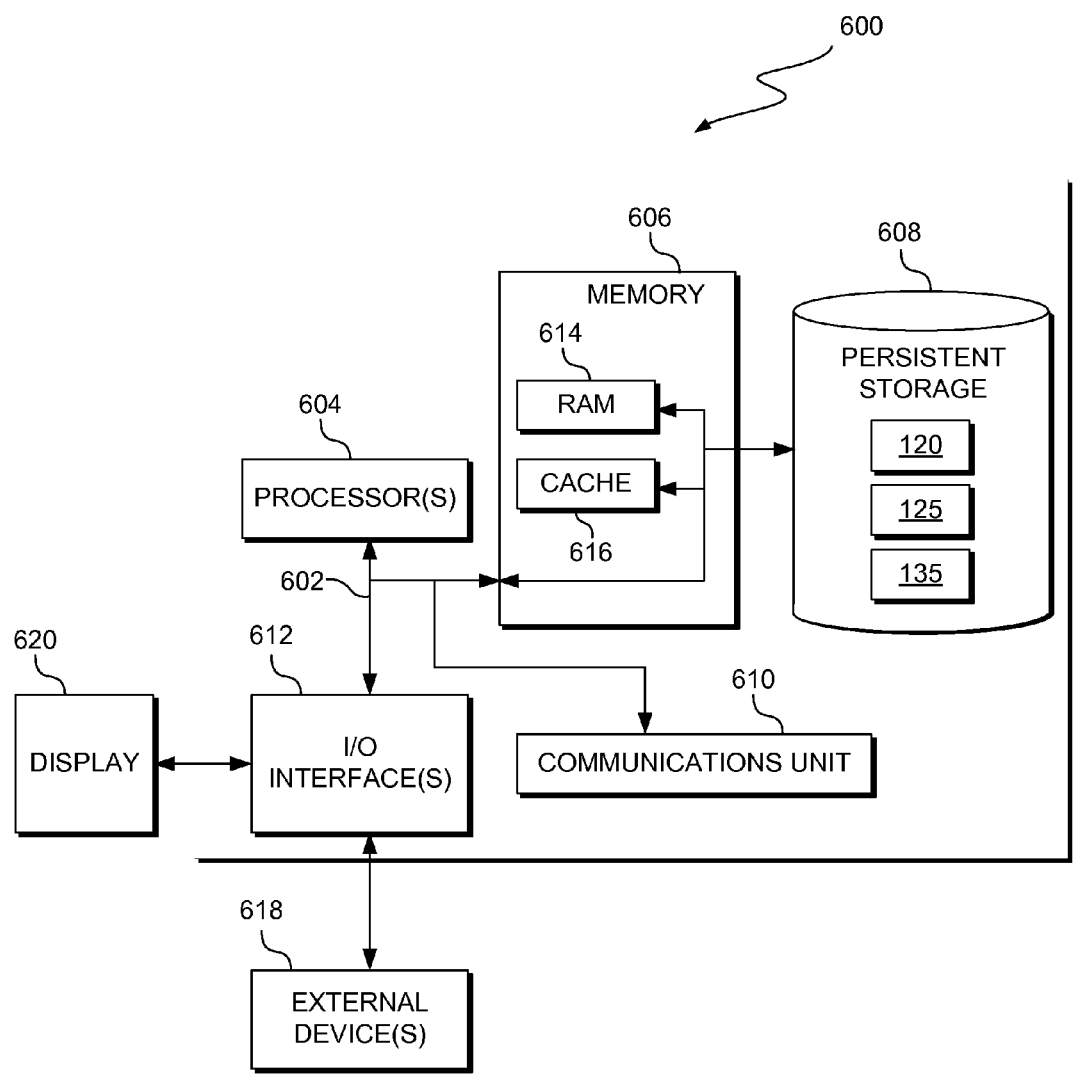
FIG. 6 depicts a block diagram of components of the computing device executing an integration serving program, in accordance with an exemplary embodiment of the present invention.

FIG. 6 depicts a block diagram, 600, of components of computing device 110, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 110 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Integration service program 120, API 125, and automation registry 135 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. Integration service program 120, API 125, and automation registry 135 may be downloaded to persistent storage 608 through communications unit 610.

I/O interface(s) 612 allows for input and output of data with other devices that may be connected to computing device 110. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., integration service program 120, API 125, and automation registry 135, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as "WEBSPHERE," "IBM TIVOLI MONITORING," "Smalltalk," and the like may be subject to trademark rights in various jurisdictions throughout the world and are used here only in reference to the products or services properly denominated by the marks to the extent that such trademark rights may exist.

What is claimed is:

1. A method of integrating application pattern instances comprising:

generating, by one or more processors, a plurality of artifacts from a first application pattern description, wherein the first application pattern description describes at least one instance of a first application pattern;

receiving, by one or more processors, a request for a capability of an instance of the first application pattern, wherein the capability is requested to augment a second application pattern instance;

analyzing, by one or more processors, a second application pattern description, wherein the second application pattern description describes the second application pattern instance;

based on an analysis of the second application pattern description, installing, by one or more processors, one or more of the plurality of artifacts against at least one server of the second application pattern instance; and executing, by one or more processors, one or more automated operations in order to enable the second application pattern instance with the capability.

2. The method of claim 1 further comprising:
modifying, by one or more processors, an automation registry with the plurality of artifacts.

3. The method of claim 1 further comprising:
based on the request for the capability, selecting, by one or more processors, components that allow a connection between one or more nodes of the second application pattern instance and one or more nodes from the instance of the first application pattern.

4. The method of claim 1 wherein the first application pattern is a system management infrastructure.

5. The method of claim 1 wherein the step of receiving, by one or more processors, a request for a capability of an instance of the first application pattern, wherein the capability is requested to augment a second application pattern instance further comprises:

receiving, by one or more processors, an application programming interface (API) call for a capability of an instance of the first application pattern, wherein the capability is requested to augment a second application pattern instance.

6. The method of claim 1 further comprising:
searching, by one or more processors, an application pattern registry for one or more instances of the first application pattern.

7. The method of claim 1 wherein the first application pattern, at least in part, executes one or more of: hardware inventories, server availability monitoring and metrics, software inventory and installation, anti-virus and anti-malware management, user activity monitoring, capacity monitoring, security management, storage management, network capacity and utilization monitoring, anti-manipulation management, and patch management.

8. A computer program product for integrating application pattern instances comprising:
one or more computer-readable storage media and program instructions stored on at least one of the one or more computer-readable storage media, the program instructions comprising:
program instructions to generate a plurality of artifacts from a first application pattern description, wherein the first application pattern description describes at least one instance of a first application pattern;
program instructions to receive a request for a capability of an instance of the first application pattern, wherein the capability is requested to augment a second application pattern instance;
program instructions to analyze a second application pattern description, wherein the second application pattern description describes the second application pattern instance;
based on an analysis of the second application pattern description, program instructions to install one or more of the plurality of artifacts against at least one server of the second application pattern instance; and
program instructions to execute one or more automated operations in order to enable the second application pattern instance with the capability.

9. The computer program product of claim 8 further comprising:
program instructions to modify an automation registry with the plurality of artifacts.

10. The computer program product of claim 8 further comprising:
based on the request for the capability, program instructions to select components that allow a connection between one or more nodes of the second application pattern instance and one or more nodes from the instance of the first application pattern.

11. The computer program product of claim 8 wherein the first application pattern is a system management infrastructure.

12. The computer program product of claim 8 wherein the program instructions to receive a request for a capability of an instance of the first application pattern, wherein the capability is requested to augment a second application pattern instance further comprises:
program instructions to receive an application programming interface (API) call for a capability of an instance of the first application pattern, wherein the capability is requested to augment a second application pattern instance.

13. The computer program product of claim 8 further comprising:
program instructions to search an application pattern registry for one or more instances of the first application pattern.

14. The computer program product of claim 8 wherein the first application pattern, at least in part, executes one or more of: hardware inventories, server availability monitoring and metrics, software inventory and installation, anti-virus and anti-malware management, user activity monitoring, capacity monitoring, security management, storage management, network capacity and utilization monitoring, anti-manipulation management, and patch management.

15. A computer system for integrating application pattern instances comprising:
one or more computer processors;
one or more computer-readable storage media; and
program instructions stored on at least one of the one or more computer-readable storage media for execution by at least one of the one or more processors, the program instructions comprising:
program instructions to generate a plurality of artifacts from a first application pattern description, wherein the first application pattern description describes at least one instance of a first application pattern;
program instructions to receive a request for a capability of an instance of the first application pattern, wherein the capability is requested to augment a second application pattern instance;
program instructions to analyze a second application pattern description, wherein the second application pattern description describes the second application pattern instance;
based on an analysis of the second application pattern description, program instructions to install one or more of the plurality of artifacts against at least one server of the second application pattern instance; and
program instructions to execute one or more automated operations in order to enable the second application pattern instance with the capability.

16. The computer system of claim 15 further comprising:
program instructions to modify an automation registry with the plurality of artifacts.

17. The computer system of claim 15 further comprising:
based on the request for the capability, program instructions to select components that allow a connection between one or more nodes of the second application pattern instance and one or more nodes from the instance of the first application pattern.

18. The computer system of claim 15 wherein the first application pattern is a system management infrastructure.

19. The computer system of claim 15 wherein the program instructions to receive a request for a capability of an instance of the first application pattern, wherein the capability is requested to augment a second application pattern instance further comprises:
program instructions to receive an application programming interface (API) call for a capability of an instance of the first application pattern, wherein the capability is requested to augment a second application pattern instance.

20. The computer system of claim 15 further comprising:
program instructions to search an application pattern registry for one or more instances of the first application pattern.

* * * * *